US012808968B2

(12) United States Patent
Almansoori et al.

(10) Patent No.: US 12,808,968 B2
(45) Date of Patent: Nov. 24, 2026

(54) DIRECTION FINDING SYSTEM BASED ON A LUNEBURG LENS DESIGN

(71) Applicant: Technology Innovation Institute—Sole Proprietorship LLC, Masdar City (AE)

(72) Inventors: Mae Almansoori, Abu Dhabi (AE); Felix Vega, Abu Dhabi (AE); Adamo Banelli, Abu Dhabi (AE); Chaouki Kasmi, Abu Dhabi (AE); Alejandro Rangel, Bogota (CO)

(73) Assignee: Technology Innovation Institute—Sole Proprietorship LLC, Masdar City (AE)

( * ) Notice: Subject to any disclaimer, the term of this patent is extended or adjusted under 35 U.S.C. 154(b) by 240 days.

(21) Appl. No.: 18/668,644

(22) Filed: May 20, 2024

(65) Prior Publication Data

US 2026/0023148 A1 Jan. 22, 2026

(30) Foreign Application Priority Data

May 26, 2023 (AE) ........................... P6001268/2023

(51) Int. Cl.
*G01S 3/04* (2006.01)
*G01S 3/16* (2006.01)
(Continued)

(52) U.S. Cl.
CPC ................ *G01S 3/043* (2013.01); *G01S 3/16* (2013.01); *G01S 3/28* (2013.01); *H01Q 15/08* (2013.01); *H01Q 15/10* (2013.01)

(58) Field of Classification Search
CPC ........ G01S 3/16–36; G01S 3/043; G01S 3/28; H01Q 15/08; H01Q 15/10; H01Q 19/06–09
See application file for complete search history.

(56) References Cited

U.S. PATENT DOCUMENTS 7,688,263 B1 3/2010 Oxley
11,340,342 B2 5/2022 Xin et al.
(Continued)

FOREIGN PATENT DOCUMENTS

WO 2020218974 10/2020
WO 2021226669 11/2021

OTHER PUBLICATIONS

Zhou, Bin et. al., "Beam-steering Vivaldi antenna based on partial Luneburg lens constructed with composite materials", 2011, Journal of Applied Physics 110, 084908 (2011) (Year: 2011).*
(Continued)

*Primary Examiner* — Cassi J Galt
(74) *Attorney, Agent, or Firm* — DLA Piper LLP

(57) ABSTRACT

A direction finding system including a gradient index lens having a plurality of stacked dielectric plates with through holes causing a gradual variation of a refractive index across a diameter of each of the plurality of stacked dielectric plates. A plurality of antennas located around a section of a perimeter of the gradient index lens. The variation of the refractive index in each of the plurality of stacked dielectric plates causes the gradient index lens to direct a radio frequency (RF) signal received by the gradient index lens towards a target antenna of the plurality of antennas. An RF processing system is configured to process an RF signal received by the plurality of antennas and determine a direction of arrival of the RF signal based on a location of the target antenna of the plurality of antennas that outputs the received signal strength above a threshold.

19 Claims, 15 Drawing Sheets

(51) Int. Cl.

| | |
|---|---|
| ***G01S 3/28*** | (2006.01) |
| ***H01Q 15/08*** | (2006.01) |
| ***H01Q 15/10*** | (2006.01) |

(56) References Cited

U.S. PATENT DOCUMENTS

| | | | | |
|---|---|---|---|---|
| 2008/0238811 | A1* | 10/2008 | Winsor | H01Q 15/10 343/911 R |
| 2014/0132455 | A1 | 5/2014 | Rollins | |
| 2021/0278518 | A1 | 9/2021 | Xin et al. | |
| 2022/0294121 | A1 | 9/2022 | Xin et al. | |
| 2023/0057530 | A1 | 2/2023 | Shmuel et al. | |

OTHER PUBLICATIONS

P. J. Gibson, "The Vivaldi Aerial," 1979 9th European Microwave Conference, Brighton, UK, 1979, pp. 101-105, doi: 10.1109/EUMA.1979.332681. (Year: 1979).*

Office Action for United Arab Emirates Patent Application No. P6001268/2023, dated Feb. 19, 2025, 1 page.

International Search Report and Written Opinion for International Application No. PCT/IB2024/054903, mailed Aug. 12, 2024, 10 Pages.

Rangel, et al., "Direction of arrival estimation using an array of stacked 2D Luneburg lenses," 2022 IEEE International Symposium on Antennas and Propagation and USNC-URSI Radio Science Meeting (AP-S/URSI), 2022.

Almansoori, M., et al. "A study of materials and additive manufacturing techniques for a novel 2D Luneburg Lens." 2022 IEEE International Symposium on Antennas and Propagation and USNC-URSI Radio Science Meeting (AP-S/URSI), 2022.

Examination Report for AE Application No. P6001268/2023, mailed May 30, 2024, 10 pages.

* cited by examiner

DIRECTION FINDING SYSTEM BASED ON A LUNEBURG LENS DESIGN

CROSS-REFERENCE TO RELATED APPLICATIONS

This application claims priority to United Arab Emirates Patent Applicated No. P6001268/2023, filed May 26, 2023, which is incorporated by reference in its entirety.

FIELD

A system and method for direction finding based on a Luneburg lens design.

BACKGROUND

Conventional antenna systems have been designed to determine direction of arrival (DOA) of received radio frequency (RF) signals. These conventional systems are typically based on antenna arrays with many elements and use differential phase, differential amplitude, or differential time techniques for DOA estimation. The techniques used for DOA estimation have disadvantages of lower accuracy or require components and complex circuitry to increase accuracy.

SUMMARY

In one aspect, the present disclosure relates to a direction finding system comprising a gradient index lens comprising a plurality of stacked dielectric plates. Each of the plurality of stacked dielectric plates having a plurality of through holes causing a gradual variation of a refractive index across a diameter of each of the plurality of stacked dielectric plates. The system also comprises a plurality of antennas located around a section of a perimeter of the gradient index lens, wherein the variation of the refractive index in each of the plurality of stacked dielectric plates causes the gradient index lens to direct a radio frequency (RF) signal received by the gradient index lens towards a target antenna of the plurality of antennas. The system further comprises an RF processing system coupled to the plurality of antennas. The RF processing system is configured to process an RF signal received by the plurality of antennas and determine received signal strength for each of the plurality of antennas, and determine a direction of arrival of the RF signal based on a location of the target antenna of the plurality of antennas that outputs the received signal strength above a threshold.

In embodiments of this aspect, according to any one of the above example embodiments, the variation of the refractive index is caused by at least one of variation in diameters of the plurality of through holes in the plurality of stacked dielectric plates, and distribution of the plurality of through holes in the plurality of stacked dielectric plates.

In embodiments of this aspect, according to any one of the above example embodiments, the plurality of stacked dielectric plates are alternatingly oriented at two or more different angles with respect to a reference direction such that the variation of the refractive index is alternatingly oriented at the two or more different angles.

In embodiments of this aspect, according to any one of the above example embodiments, the system further comprises spacers forming gaps between the plurality of stacked dielectric plates.

In embodiments of this aspect, according to any one of the above example embodiments, the plurality of antennas are Vivaldi antennas.

In embodiments of this aspect, according to any one of the above example embodiments, plurality of antennas are separated by predetermined angles around the section of the perimeter of the gradient index lens.

In embodiments of this aspect, according to any one of the above example embodiments, the section of the perimeter of the gradient index lens where the plurality of antennas are located is a half of the perimeter of the gradient index lens, the section being oriented to face opposite the direction of arrival of the RF signal.

In embodiments of this aspect, according to any one of the above example embodiments, the RF processing system further comprises an RF circuit configured to down convert the received RF signal from each of the plurality of antennas to an intermediate frequency (IF) signal, and a signal processor configured to determine a maximum of the received signal strength from the IF signal of the plurality of antennas, and determine the direction of arrival of the RF signal based on a location of a target antenna of the plurality of antennas that outputs the maximum of the received signal strength.

In embodiments of this aspect, according to any one of the above example embodiments, the plurality of antennas extend along an azimuth plane and the RF processing system is configured to determine the direction of arrival of the RF signal on the azimuth plane.

In embodiments of this aspect, according to any one of the above example embodiments, the system further comprises an additional gradient index lens comprising a plurality of additional stacked dielectric plates, each of the plurality of additional stacked dielectric plates having a plurality of through holes causing a gradual variation of a refractive index across a diameter of each of the additional plurality of stacked dielectric plates, and an additional plurality of antennas located around a section of a perimeter of the additional gradient index lens, wherein the variation of the refractive index in each of the additional plurality of stacked dielectric plates causes the additional gradient index lens to direct the RF signal received by the gradient index lens towards a target antenna of the additional plurality of antennas, and wherein the additional plurality of antennas extend along an elevation plane and the RF processing system is configured to determine the direction of arrival of the RF signal on the elevation plane.

In one aspect, the present disclosure relates to a gradient index lens system comprising a gradient index lens comprising a plurality of stacked dielectric plates. Each of the plurality of stacked dielectric plates having a plurality of through holes causing a gradual variation of a refractive index across a diameter of each of the plurality of stacked dielectric plates. The system also includes a plurality of antennas located around a section of a perimeter of the gradient index lens, wherein the variation of the refractive index in each of the plurality of stacked dielectric plates causes the gradient index lens to direct a radio frequency (RF) signal received by the gradient index lens towards a target antenna of the plurality of antennas.

In embodiments of this aspect, according to any one of the above example embodiments, the variation of the refractive index is caused by at least one of variation in diameters of the plurality of through holes in the plurality of stacked dielectric plates, and distribution of the plurality of through holes in the plurality of stacked dielectric plates.

In embodiments of this aspect, according to any one of the above example embodiments, the plurality of stacked dielectric plates are alternatingly oriented at two or more different angles with respect to a reference direction such that the variation of the refractive index is alternatingly oriented at the two or more different angles.

In embodiments of this aspect, according to any one of the above example embodiments, the system further comprises spacers forming gaps between the plurality of stacked dielectric plates.

In embodiments of this aspect, according to any one of the above example embodiments, the gaps between the plurality of stacked dielectric plates are air gaps or are filled with dielectric material.

In embodiments of this aspect, according to any one of the above example embodiments, the plurality of antennas are Vivaldi antennas.

In embodiments of this aspect, according to any one of the above example embodiments, the plurality of antennas are separated by predetermined angles around the section of the perimeter of the gradient index lens.

In embodiments of this aspect, according to any one of the above example embodiments, the predetermined angles between the plurality of antennas correspond to a predetermined target antenna granularity with respect to a direction of arrival of the RF signal.

In embodiments of this aspect, according to any one of the above example embodiments, the section of the perimeter of the gradient index lens where the plurality of antennas are located is a half of the perimeter of the gradient index lens, the section being oriented to face opposite a direction of arrival of the RF signal.

In embodiments of this aspect, according to any one of the above example embodiments, the plurality of antennas comprises at least N antennas spaced D degrees apart, wherein N and D are predetermined to correspond to an angular accuracy of the gradient index lens system.

BRIEF DESCRIPTION OF THE DRAWINGS

So that the way the above-recited features of the present disclosure can be understood in detail, a more particular description of the disclosure, briefly summarized above, may be made by reference to example embodiments, some of which are illustrated in the appended drawings. It is to be noted, however, that the appended drawings illustrate only example embodiments of this disclosure and are therefore not to be considered limiting of its scope, for the disclosure may admit to other equally effective example embodiments.

DETAILED DESCRIPTION

Figure 1A:
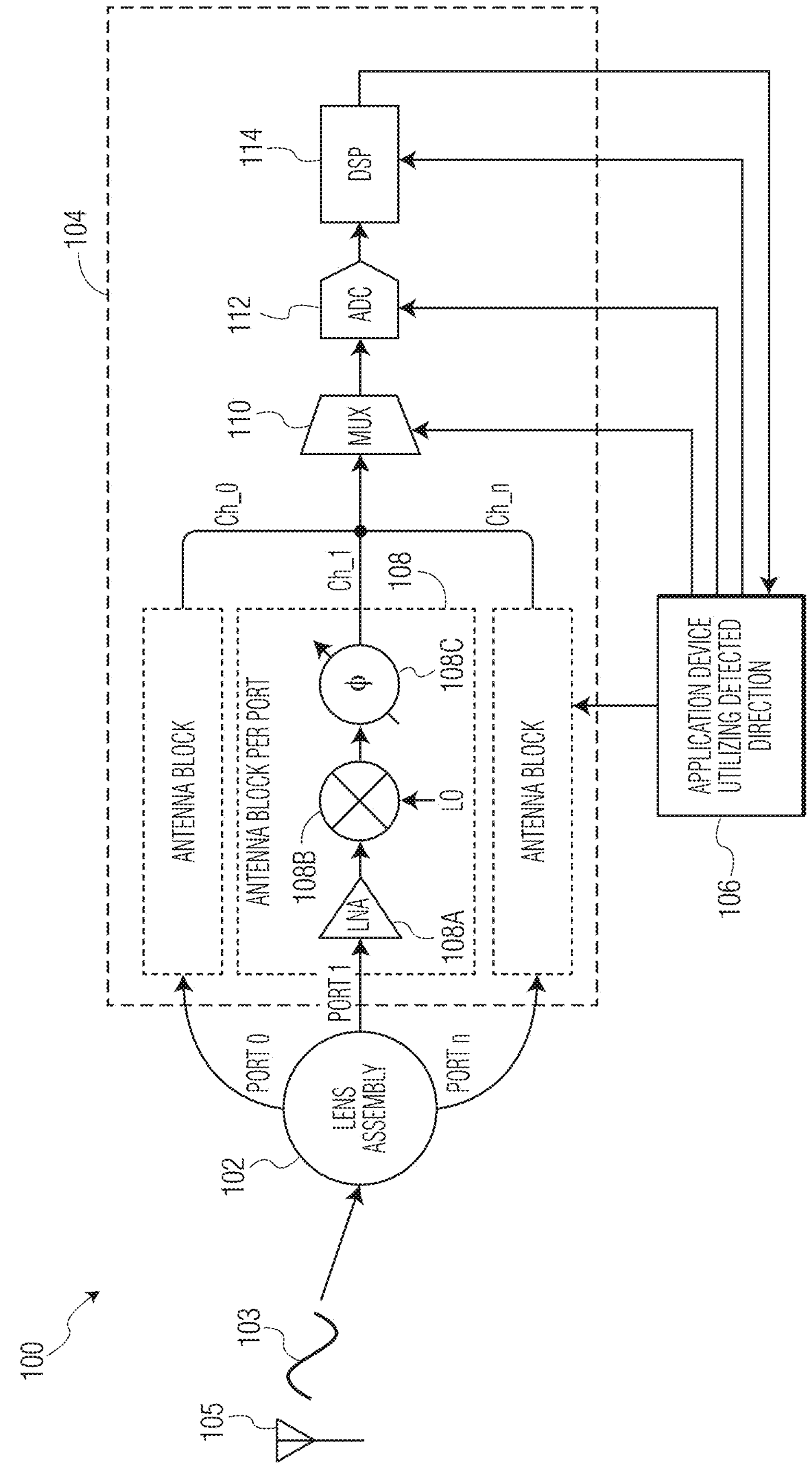
FIG. 1A shows a block diagram of a direction finding system, according to an example embodiment of the present disclosure.

Various example embodiments of the present disclosure will now be described in detail with reference to the drawings. It should be noted that the relative arrangement of the components and steps, the numerical expressions, and the numerical values set forth in these example embodiments do not limit the scope of the present disclosure unless it is specifically stated otherwise. The following description of at least one example embodiment is merely illustrative in nature and is in no way intended to limit the disclosure, its application, or its uses. Techniques, methods, and apparatus as known by one of ordinary skill in the relevant art may not be discussed in detail but are intended to be part of the specification where appropriate. In all the examples illustrated and discussed herein, any specific values should be interpreted to be illustrative and non-limiting. Thus, other example embodiments may have different values. Notice that similar reference numerals and letters refer to similar items in the following figures, and thus once an item is defined in one figure, it is possible that it need not be further discussed for the following figures. Below, the example embodiments will be described with reference to the accompanying figures.

The disclosed methods, devices and systems herein overcome the limitations of the existing systems to provide a direction of arrival (DOA) estimation system that is low cost, portable and possesses high accuracy. The disclosed methods, devices and systems utilize a gradient index lens (e.g., Luneburg lens) having a refractive index that gradually changes across the lens material thereby facilitating beamforming of the incoming radio frequency (RF) signal via refraction. The gradient index lens may be produced with additive manufacturing (e.g., 3D printing) techniques. The additive manufacturing may create various 2D plates having a respective refractive index that gradually changes across their dimensions (e.g., across the diameter). These plates are then stacked to create the Luneburg lens. The gradually changing refractive index of the Luneburg lens refracts the received RF signal impinging on one side of the lens and focuses the RF energy on a focal point on the opposite side of the lens. The location of the focal point is responsive to the angle in which the incoming RF signal impinges on the Luneburg lens (i.e., the location of the focal point is related to the DOA of the RF signal). Antennas are positioned at select angular positions (e.g., every) 15° around a section (e.g., half) of the Luneburg lens perimeter to produce a Luneburg lens assembly, such that the focal point of the refracted RF is focused directly on or in proximity to one of the antennas. The antenna (i.e., target antenna) aligned with or closest to the focal point of the refracted RF produces a maximum received signal among the antennas, which is detected by RF reception electronics. The known angular position of this target antenna corresponds to the DOA of the incoming RF signal. For example, if the target antenna is oriented 45° with respect to a reference direction of the Luneburg lens assembly, then the RF signal is determined to be transmitted from a direction of 45° relative to the Luneburg lens assembly. The Luneburg lens and antennas have broadband functionality but may be optimized for a particular frequency (e.g., 1.5 GHZ).

Practical applications of the disclosed methods, devices and systems herein include but are not limited to localizing interference sources (e.g., global positioning system (GPS) interference sources at 1.5 GHZ), radar and navigation. Benefits of the disclosed methods, devices and systems include but are not limited to providing a DOA estimation system that is low cost, portable and possesses high accuracy. Advantages include wide angle radiation scanning due to broadband behavior, high gain and multibeam forming capability. In addition, the additive manufacturing techniques provide for case of manufacturing and assembly for otherwise complex Luneburg lens configurations that would require complex molding and/or cuts.

It is noted that for ease of description, the direction finding system is described as providing DOA information in a Cartesian Coordinate system. However, it is noted that angle of arrival (AOA) in a Spherical Coordinate system may also be computed by the direction finding system. In addition, DOA and AOA on multiple axes can also be computed when two or more Luneburg lens assemblies are deployed.

FIG. 1A shows a block diagram of a direction finding system 100. Direction finding system 100 includes Luneburg lens assembly 102, radio frequency (RF) system 104 which is connected to application device 106. Luneburg lens assembly 102 includes a Luneburg lens (not shown) and various antennas (not shown) positioned around a portion of the Luneburg lens. RF processing system 104 includes antenna blocks 108 connected to each of the antennas. The antenna blocks include electronics for converting the frequency of the RF signal received by each of the antennas. These electronics may include low noise amplifier 108A, mixer 108B with an input from a local oscillator (LO), and phase shifter 108C. Also included in RF processing system 104 is multiplexer 110, analog to digital converter (ADC) 112 and digital signal processor (DSP) 114.

During operation, an incoming RF signal 103 transmitted from transmitter target 105 is received on the front side (i.e., transmission target facing side) of Luneburg lens assembly 102. The Luneburg lens refracts and directs RF signal 103 to a focal point on the back side (i.e., side opposite the transmission target facing side) of the Luneburg lens where the reception antennas are located. Each of the reception antennas produce an electrical signal in response to the refracted RF signal, and the antenna blocks 108 amplify, down-convert the signal to an intermediate frequency (IF) signal and phase shift the IF signal for processing. The IF signals from each of the antenna blocks 108 are then multiplexed by multiplexer 110 for processing. For example, the IF signals may be multiplexed by frequency shifting, and then processed separately by being converted by ADC 112 to digital signals and processed by DSP 114 to determine DOA. In one example, DSP 114 may determine a maximum of the processed signals (i.e., the antenna that outputs the maximum signal). For example, DSP 114 may compare the processed received signal strengths to one another or to a threshold to determine the maximum received signal. The antenna that received the maximum signal may then be identified as the target antenna (i.e., the antenna located closest to the focal point of the RF signal through the Luneburg lens). Since DSP 114 knows the mounting angles of the antennas within Luneburg lens assembly 102, DSP 114 can determine the DOA of the RF signal relative to Luneburg lens assembly 102. For example, if the antenna located at 0° in Luneburg lens assembly 102 produces the maximum signal, then DSP 114 determines that the incoming RF signal has a DOA of 0° relative to a reference angle of Luneburg lens assembly 102. Likewise, if the antenna located at 45° produces the maximum signal and is therefore the target antenna, then DSP 114 determines that the incoming RF signal has a DOA of 45° relative to a reference angle of Luneburg lens assembly 102. In one example, the reference angle may be a cross section of the Luneburg lens assembly 102 relative to the position of the antenna array.

The DOA determined by DSP 114 may be output to an application device 106 (e.g., microcontroller, personal computer (PC), smart device, etc.) which may be executing software that utilizes the determined DOA to execute a practical application such as localizing RF interference sources and adjusting reception parameters to minimize interference from these sources. For example, application device 106 may be a GPS receiver where the GPS receiver may try to localize and reject interfering sources, thereby increasing signal to noise ratio (SNR) of the received GPS signal. Of course, many other applications are possible with the use of the determined DOA.

It is also noted that application device 106 may be coupled to RF processing system 104 such that application device 106 can control operational parameters of antenna blocks 108, multiplexer 110, ADC 112 and DSP 114. This configuration allows application device 106 to control parameters for optimizing the DOA for a given application.

Figure 1B:
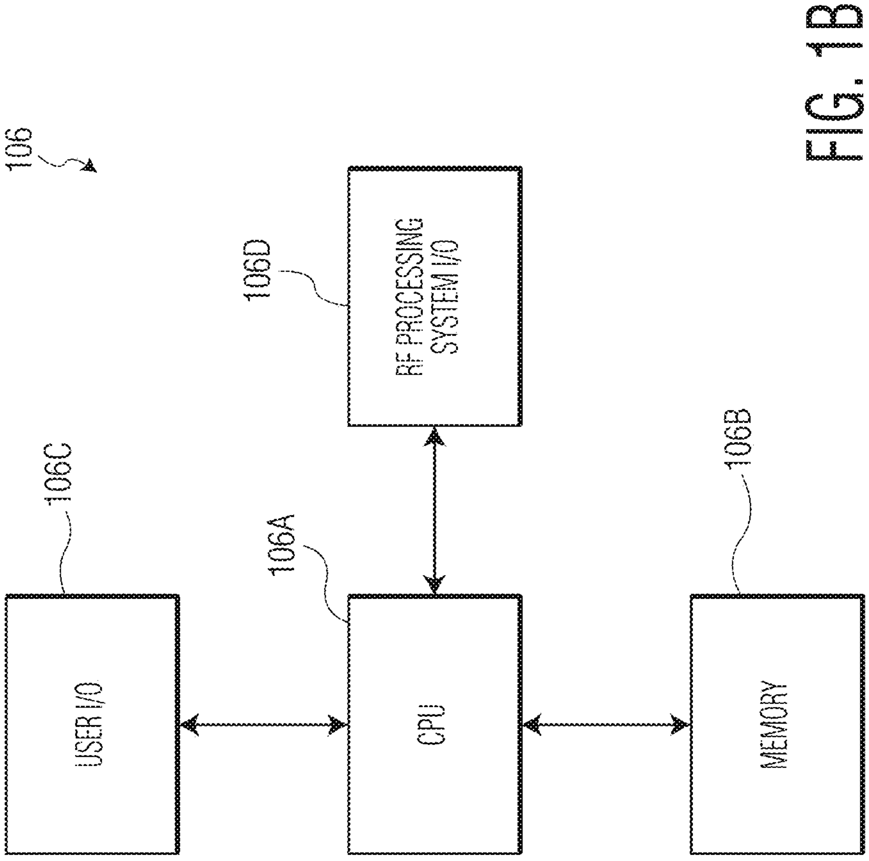
FIG. 1B shows a block diagram of an application device, according to an example embodiment of the present disclosure.

FIG. 1B shows a block diagram of an application device 106. As mentioned above, application device 106 may be an external device (e.g., microcontroller, personal computer (PC), smart device, etc.) that utilizes the determined DOA for practical applications. Application device 106 may generally include a processor (CPU) 106A, memory 106B, user input/output (I/O) 106C and RF processing system I/O 106D. During operation, CPU 106A may receive user input via user I/O 106C to execute a practical application. CPU 106A may then retrieve DOA data via RF processing system I/O 106D. This DOA data may then be processed by CPU 106A according to a programmed practical application (e.g., GPS interference minimization) stored in memory 106B.

Figure 2A:
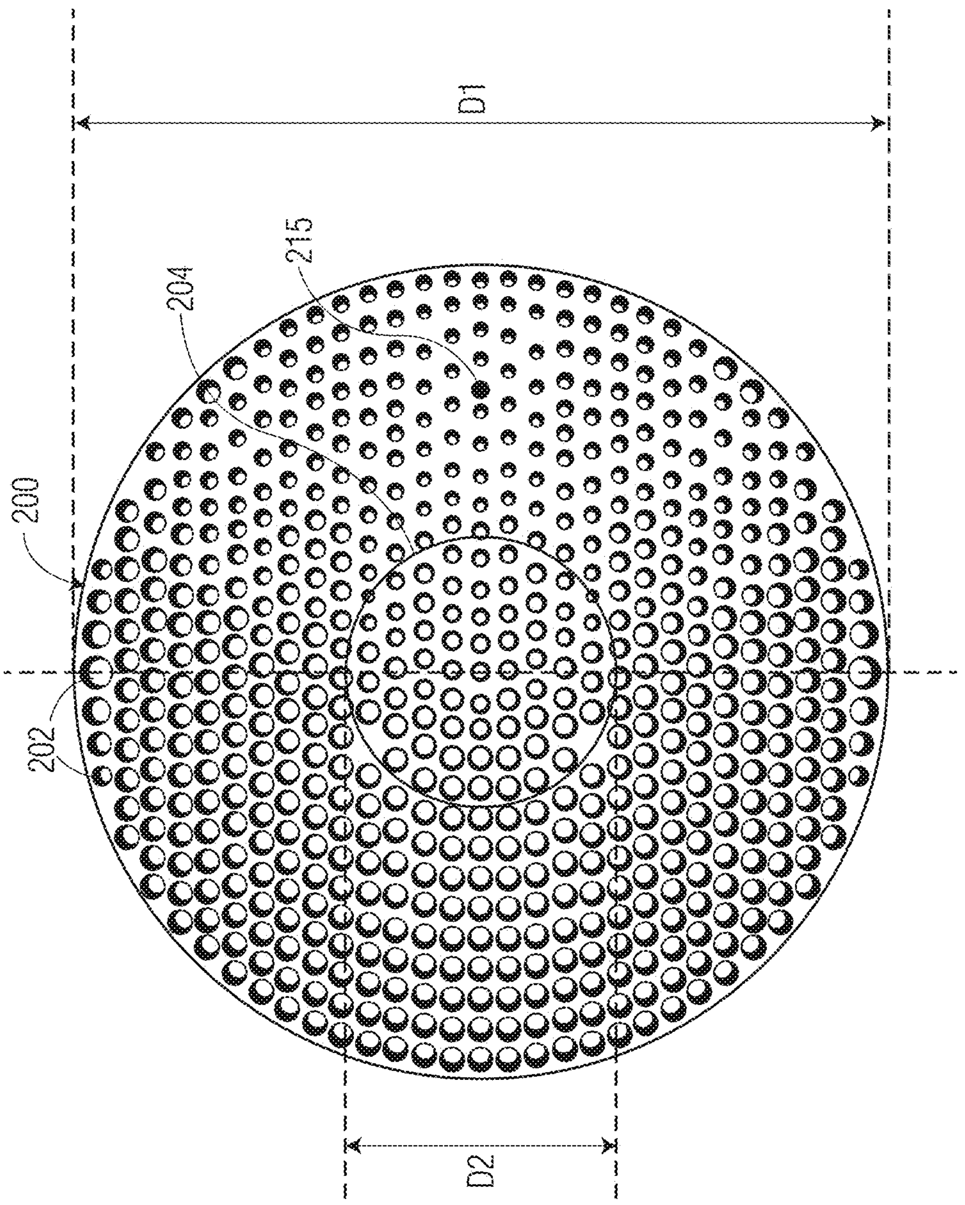
FIG. 2A shows a top view of a Luneburg lens plate, according to an example embodiment of the present disclosure.

Luneburg lens assembly 102 generally includes a Luneburg lens comprised of stacked Luneburg plates. FIG. 2A shows a top view of a single Luneburg lens plate 200. As shown, Luneburg lens plate 200 may be a circular plate (although other shapes are possible) having diameter D1. In addition, a spacer 204 having diameter D2 may be integral to Luneburg lens plate 200 or may be a separate component.

It is noted that Luneburg lens plate 200 and spacer 204 have through holes 202 of varying diameter. The diameters of holes 202 gradually vary across the diameter of lens plate 200 to control the refractive index of the plate. For example, as shown in FIG. 2A, the diameters of holes 202 increase in a radial manner from an origin point 215 that is located on the right side of the plate. This gradual variation in hole diameters creates a gradual variation in the refractive index of lens plate 200.

Refractive index is dictated by the properties of the material that the RF wave passes through. Generally, the material that the RF wave passes through has a refractive index which is greater than that of air (e.g., air has a refractive index of 1). If Luneburg lens plate 200 does not include holes, the refractive index is constant across Luneburg lens plate 200. However, the refractive index across Luneburg lens plate 200 may be controlled by adding holes (i.e., air inclusions) into the material. Specifically, as more holes, larger holes, etc. are added to the material, the more the refractive index decreases and the less the RF wave is refracted. Conversely, as the number and dimensions of holes in the material is decreased, the more the refractive index increases and the more the RF wave is refracted. In FIG. 2A, for example, the RF wave undergoes more refraction in the area of Luneburg lens plate 200 with the smaller diameter holes (e.g., area on the right side of Luneburg lens plate 200), because the refractive index is higher in this area. In contrast, the RF wave undergoes less refraction in the area of Luneburg lens plate 200 with the larger diameter holes (e.g., area on the left side of Luneburg lens plate 200), because the refractive index is lower in this area. Therefore, the diameters and positioning of the holes are configurable to achieve a desired refractive index profile across the Luneburg lens plate 200.

The diameters of the holes and relative space between adjacent holes can vary significantly depending on various factors including but not limited to frequency of operation, desired accuracy and material used to construct the Luneburg lens plates. The diameter of the holes could also depend on the distance between adjacent holes and vice versa. In general, the size of the holes, spacing between the holes and overall distribution of the holes are chosen to achieve a continuously varying refractive index that may be spherically symmetric such that incoming RF waves from one side of Luneburg lens plate 200 are curved to a common focal point on the opposite side of Luneburg lens plate 200. In one non-limiting example, the hole diameters may be in the range 1 mm-4 mm.

By increasing the ratio between the smallest size hole to the largest size hole, for example, the refractive index results in a steeper refractive bend in the RF wave. In contrast, by decreasing the ratio between the smallest size hole and the largest size hole, for example, the refractive index results in a shallower refractive bend in the RF wave. The ratio between the smallest size hole to the largest size hole may be set based on the overall diameter of Luneburg lens plate 200 to ensure that the incoming RF wave bends to the proper focal point at the perimeter of Luneburg lens plate 200.

Similarly, by increasing the space between adjacent holes, for example, the refractive index results in a steeper refractive bend in the RF wave. In contrast, by decreasing the space between adjacent holes, for example, the refractive index results in a shallower refractive bend in the RF wave. The space between adjacent holes may be set based on the overall diameter of Luneburg lens plate 200 to ensure that the incoming RF wave bends to the proper focal point at the perimeter of Luneburg lens plate 200.

Figure 2B:
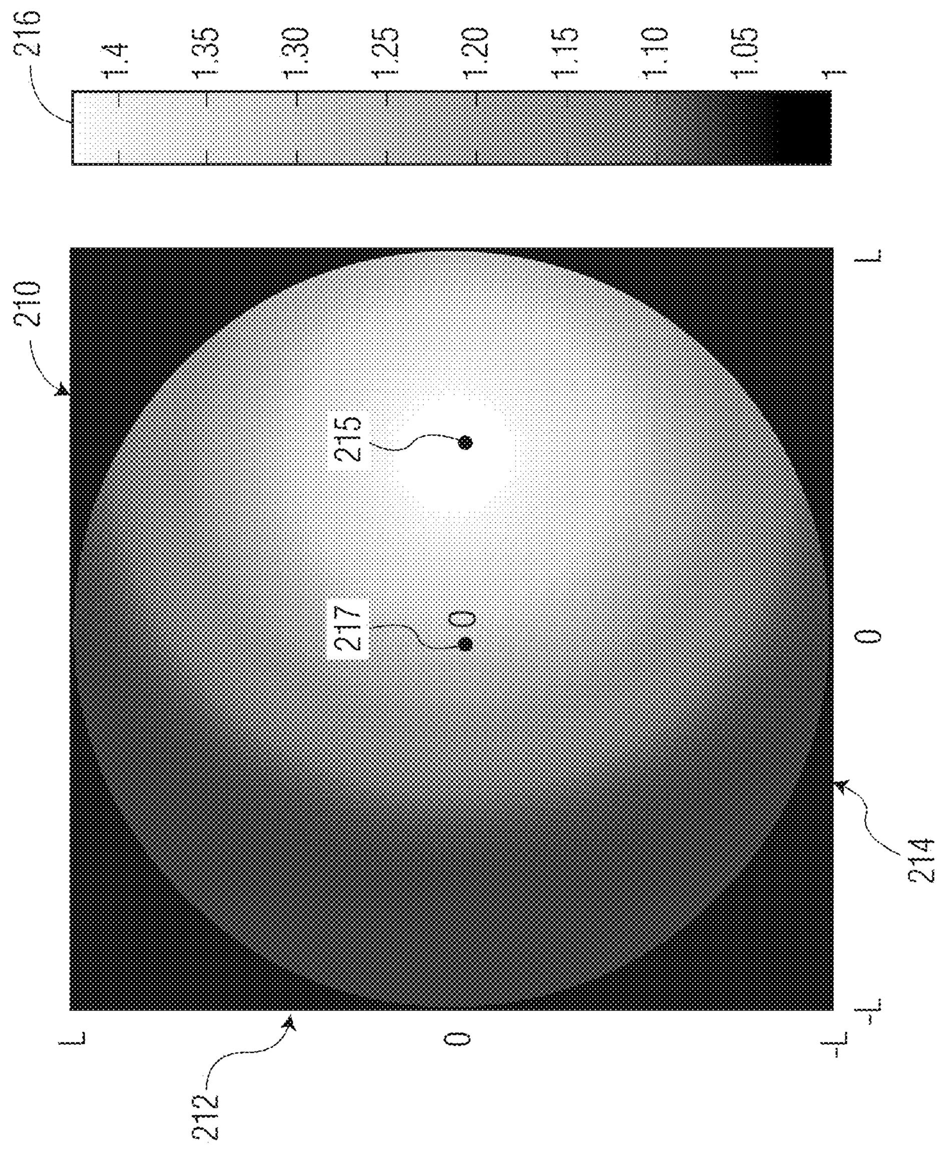
FIG. 2B shows the refractive index distribution of the Luneburg lens plate in FIG. 2A, according to an example embodiment of the present disclosure.

An example of the varying refractive index of Luneburg lens plate 200 is shown in plot 210 of FIG. 2B. The refractive index values in FIG. 2B may be computed by software modeling of the known lens plate design or by experimental testing with the manufactured lens plate (e.g., irradiating the Luneburg lens plate with RF and measuring the refractive index values). As shown in FIG. 2B, the refractive index 216 is largest at origin point 215 of Luneburg lens plate 200 and gradually decreases when moving radially along axes 212 and 214 from origin point 215. It is noted that origin point 215 is offset from plate center point 217. This offset is to ensure that RF signals received on the right side of the plate (i.e., transmission target facing side of the plate) are refracted to a focal point on the left side of the plate (i.e., antenna array side of the plate). More details regarding the refraction are discussed with respect to later figures.

Figure 2C:
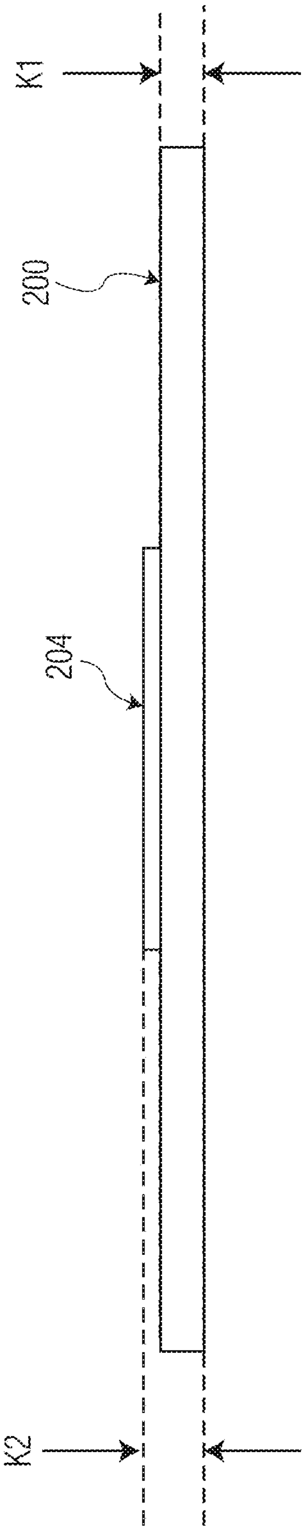
FIG. 2C shows a side view of a Luneburg lens plate, according to an example embodiment of the present disclosure.

FIG. 2C shows a side view of a Luneburg lens plate 200 having a thickness K1. The combination of Luneburg lens plate 200 and spacer 204 have a thickness of K2. In general, the thickness values K1 and K2 may be set based on the desired reception frequencies of the RF signals to be received by Luneburg lens assembly 102.

Figure 2D:
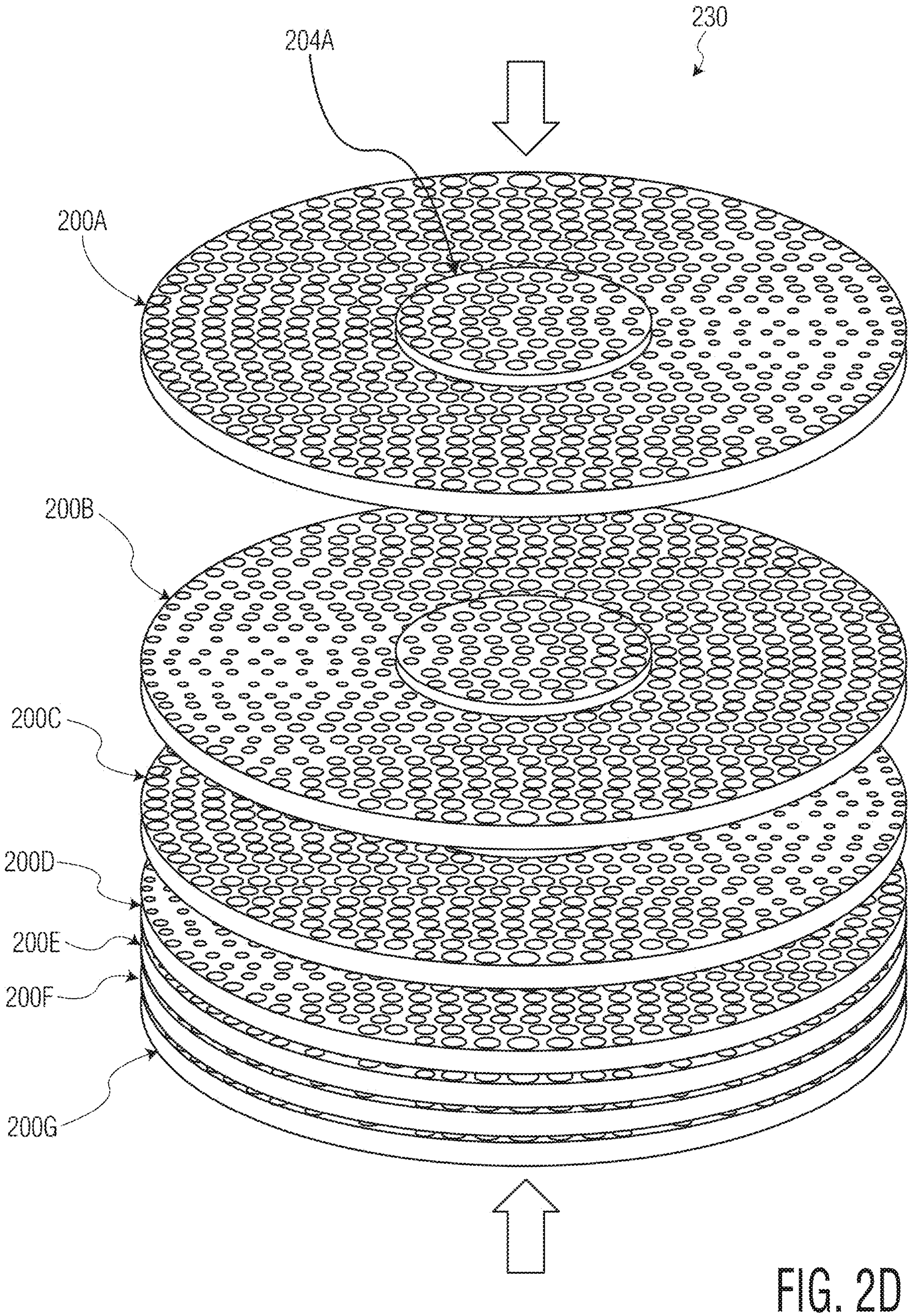
FIG. 2D shows a perspective view of a Luneburg lens being assembled from stacked Luneburg lens plates, according to an example embodiment of the present disclosure.

FIG. 2D shows a perspective view of a Luneburg lens 230 being assembled from stacked Luneburg lens plates. In this example, Luneburg lens 230 is comprised of seven stacked Luneburg lens plates 200A, 200B, 200C, 200D, 200E, 200F and 200G that are each spaced apart by respective spacers (e.g., 204A). As the plates are stacked, they are alternatingly rotated by a predetermined angle with respect to one another to achieve a desired Luneburg lens diffraction response. In the example shown in FIG. 2D, the rotation angle between adjacent plates is set at 180°. The rotation angle, however, is not limited to 180° and can be any rotation angle. In addition, the rotation angle can vary between the plates.

Figure 2E:
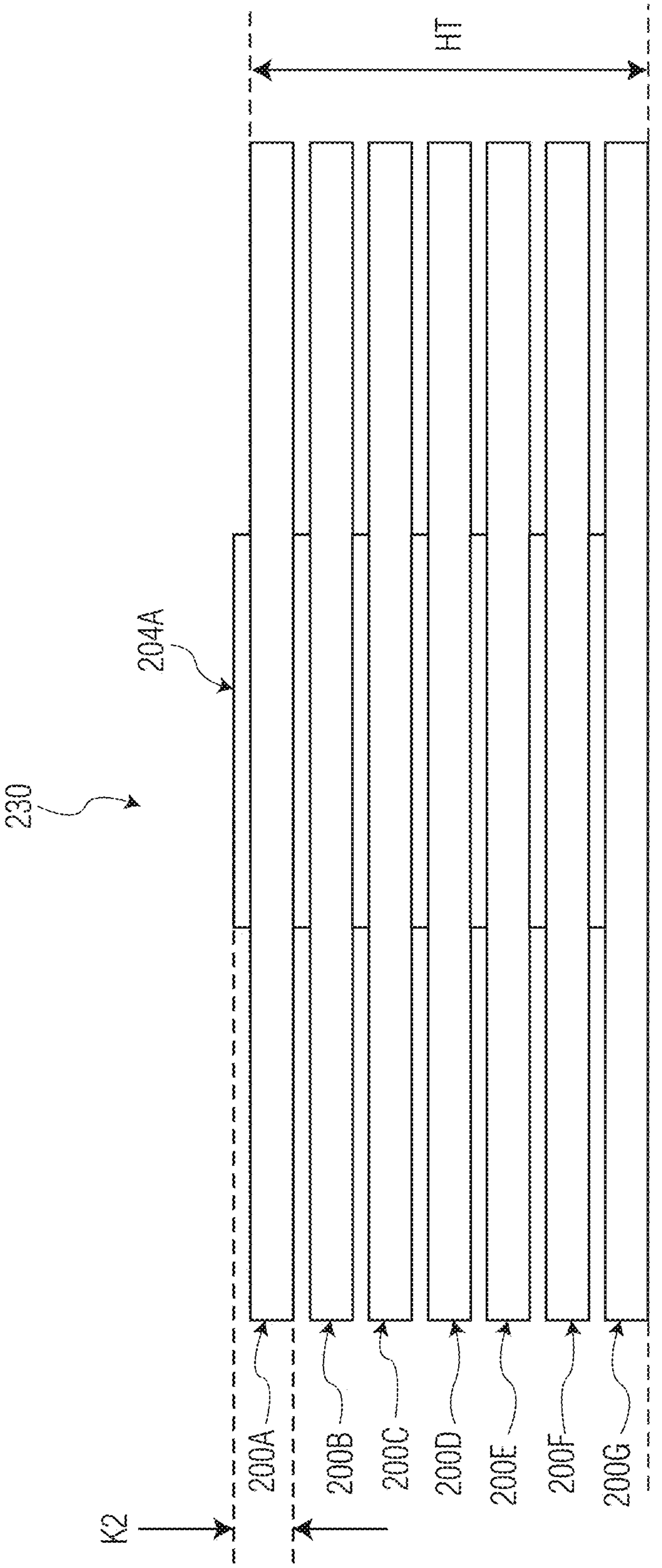
FIG. 2E shows a side view of the assembled Luneburg lens in FIG. 2D, according to an example embodiment of the present disclosure.
Figure 2F:
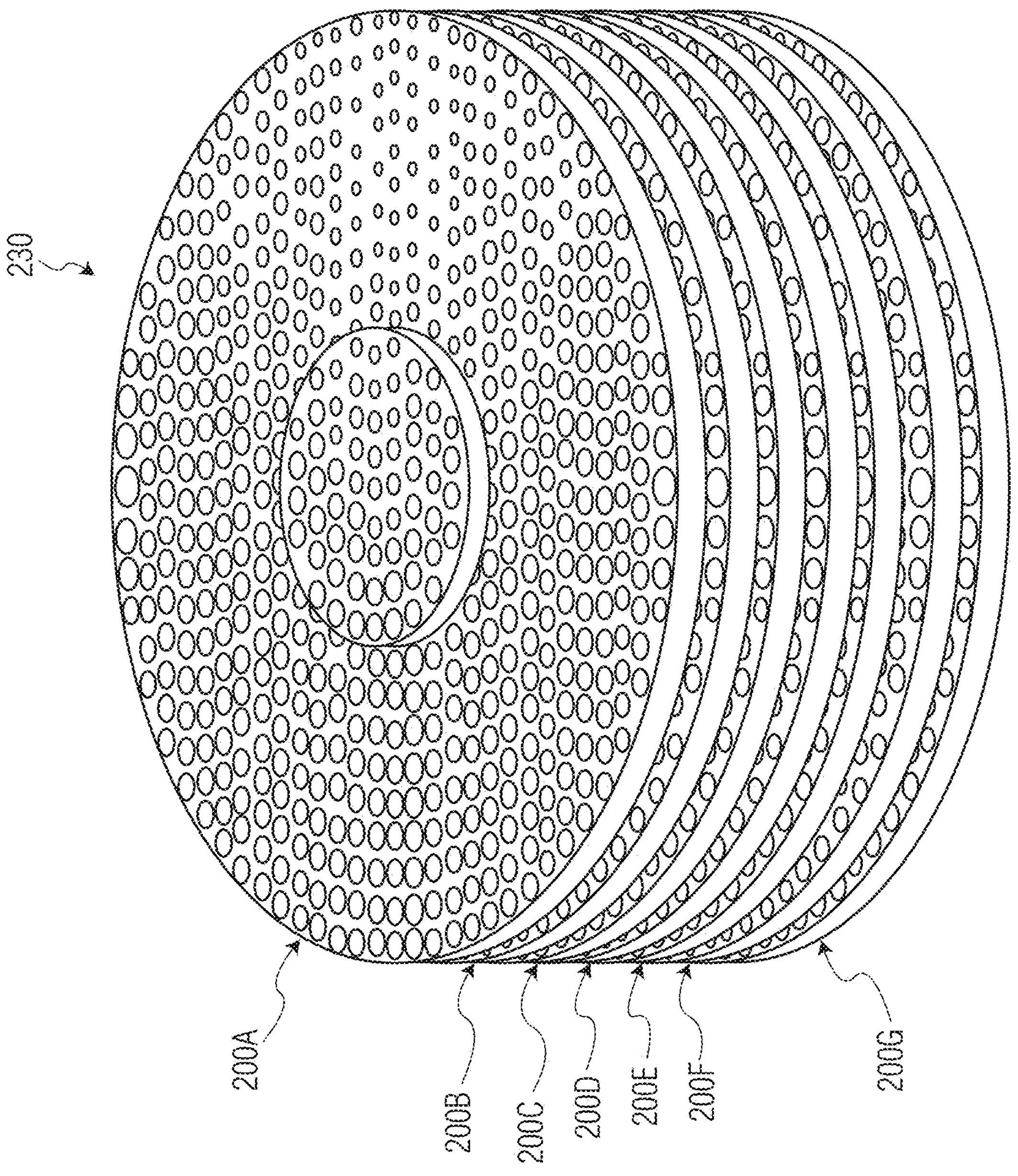
FIG. 2F shows a perspective view of the assembled Luneburg lens in FIG. 2D, according to an example embodiment of the present disclosure.

A side view of the assembled Luneburg lens in FIG. 2D is shown FIG. 2E. When Luneburg lens plates 200A, 200B, 200C, 200D, 200E, 200F and 200G are stacked on one another and spaced apart by spacers (e.g., 204A), Luneburg lens 230 achieves a height HT. FIG. 2F shows a perspective view of the assembled Luneburg lens in FIG. 2D.

It is noted that the Luneburg lens plate 200 and spacer 204 shown in FIGS. 2A and 2C may be additively manufactured using techniques such as 3D printing. These plates and spacers may be integral components or may be separate components. In either example, the Luneburg lens plate 200 and spacer 204 are stacked during assembly as shown in FIG. 2D to produce Luneburg lens 230 in FIGS. 2E and 2F. In yet another example, all of the Luneburg lenses and plates shown in FIGS. 2E and 2F may be additively manufactured as a single monolithic Luneburg lens such that manual assembly is not required.

FIG. 2E shows that the spacers produce an air gap between adjacent Luneburg lens plates. It is noted, however, that in another example, the air gaps can be filled with material that provides further structural support while not impacting the refractive performance of the Luneburg lens. This filler material may be added during 3D printing or as separate components during assembly of the plates.

It is noted that the dielectric constant of material affects both the refractive index of the material and the tangent losses as the signal propagates through the material. The material used to additively manufacture the Luneburg lens plates and spacers may include any dielectric material having a dielectric constant greater than air and reasonable tangent losses for the propagating RF wave. A material having a dielectric constant suitable to produce a refractive index sufficient to bend the RF wave over a shorter distance, and a relatively low tangent loss to minimize signal loss may be beneficial. Some examples of dielectric material to be used for Luneburg lens construction include but not limited to Poly Lactic Acid (e.g., dielectric constant=2.60 and tangent losses=0.01), Acrylonitrile Butadiene Styrene (e.g., dielectric constant=3.07 and tangent losses=0.06), Nylon Glass Beads (e.g., dielectric constant=3.40 and tangent losses=0.05) to name a few. The additive manufacturing techniques may include Fused Deposition Modeling, Stereolithography, and material jetting processing to name a few.

As mentioned above, the refractive index of the Luneburg lens plates is controlled by adding holes (e.g., air inclusions) into the plates. The permittivity profile of the Luneburg lens plates can be realized using equation (1) below:

$$\tilde{\varepsilon}_{r_i}(r_L) = \frac{Nb^2 + \varepsilon_{r_L}\left[(r_L+b)^2 - (r_L-b)^2 - Nb^2\right]}{(r_L+b)^2 - (r_L-b)^2} \quad \text{Eq. 1}$$

In this example, N is the number of holes, b is the radius of the holes, and $r_L$ is the radius of the lens. The effective relative permittivity can be estimated by weighted average of the volume of the holes having a relative permittivity of 1 and the base material having a relative permittivity of $\varepsilon_{r_L}$. From equation (1), the total number of holes needed to realize the permittivity distribution of the Luneburg lens may be computed.

The permittivity profile of the Luneburg lens plates results in a refractive index that varies in a radial manner from an origin point (e.g., point 215) located on the plate. It is noted that the refractive index of the Luneburg lens plate may vary according to equations (2), (3) and (4) below, where n(r) is the refractive index as a function of the (x, y) coordinates of the plate, r is the radius of the measurement point from the origin point 215, and L is the outer radius of the plate:

$$n(r) = \sqrt{2 - \left(\frac{r}{L}\right)^2} \quad \text{Eq. 2}$$

$$r^2 = \left(x - \frac{2L}{3}\right)^2 + y^2 \quad \text{Eq. 3}$$

$$\left(x - \frac{L}{2}\right)^2 + y^2 \leq L^2 \quad \text{Eq. 4}$$

The dimensions (e.g., D1, D2, K1, K2, HT, etc.) of the Luneburg lens plates and spacers are generally designed based on frequency of operation, desired accuracy and material used to construct the Luneburg lens plates to achieve a desired refractive index. In one non-limiting example, D1 may be 200 mm, D2 may be 66 mm, K1 may be 7.7 mm, K2 may be 13 mm and HT may be 91 mm. The above values may also be selected from ranges of values. In one non-limiting example, D1 may be set in the range of 150 mm-250 mm, D2 may be set in the range of 33 mm-99 mm, K1 may be set in the range of 3 mm-12 mm, K2 may be set in the range of 6 mm-20 mm and HT may be set in the range of 45 mm-137 mm. In general, the dimensions and materials used to manufacture the Luneburg lens plates and spacers are chosen based the RF signals to be received.

Figure 3A:
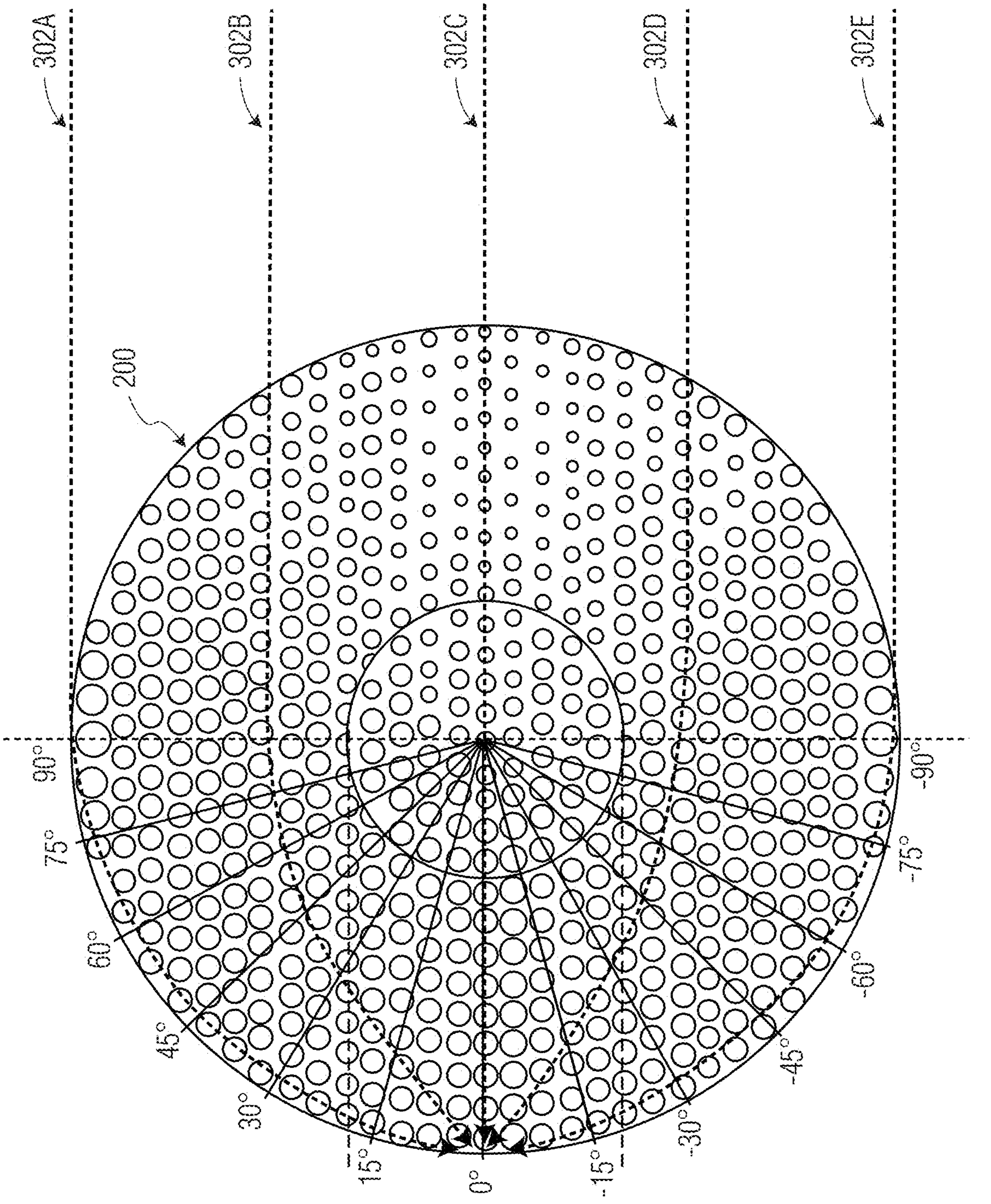
FIG. 3A shows antenna angular positions on a Luneburg lens plate, according to an example embodiment of the present disclosure.

As mentioned above, the refractive index of each Luneburg lens plate varies by gradually decreasing radially from a point of origin. This variation has a goal of focusing the incoming RF signal onto a target antenna within Luneburg lens assembly 102. FIG. 3A shows antenna angular positions on a Luneburg lens plate 200 and shows the refraction of an incoming RF signal towards the antenna array (e.g., RF signal is transmitted from right to left in FIG. 3A).

An array of antennas (not shown) may be placed on the back side (i.e., side opposite the side facing the transmission target) of Luneburg lens plate 200 at predetermined angles (i.e., angular intervals) around the plate perimeter. In this example, the predetermined angles are marked every 15°. As an incoming RF signal, depicted by plane wave rays 302A-302E, impinges on Luneburg lens plate 200 from an angle of 0° (e.g., direction perpendicular to the 90° reference line), rays 302A, 302B, 302C, 302D and 302E are refracted towards the target antenna located at 0°. Although all of the antennas may receive at least some power from the incoming RF signal, the target antenna located at 0° receives the maximum power and therefore produces a maximum electrical signal that is input to RF processing system 104. It is noted that the angle in which the RF signal impinges on Luneburg lens plate 200 dictates the location of the target antenna that receives the maximum power of the signal. For example, if the RF signal impinges on Luneburg lens plate 200 from an angle of 45° (not shown), rays 302A-302E are refracted towards the target antenna located at 45°. Again, although all of the antennas may receive some power from the incoming RF signal, the target antenna located at 45° receives the most power and therefore produces a maximum electrical signal that is input to the RF processing system 104. Since the angular position of the target antenna is already known due to manufacturing of the Luneburg lens assembly 102, DSP 114 is able to determine that the incoming RF signal was received from an angle of 45°, which is set as the DOA.

Again, it is noted that the corresponding antenna angles are measured from a reference angle of the Luneburg lens assembly 102. In this example, the reference angle of the Luneburg lens assembly 102 may be the 90° line drawn through the diameter of the Luneburg lens plate in FIG. 3A. Specifically, the Luneburg lens assembly 102 may be positioned in the field such that the 90° line is perpendicular or close to perpendicular to the known or anticipated direction of the RF target transmitting device.

Figure 3B:
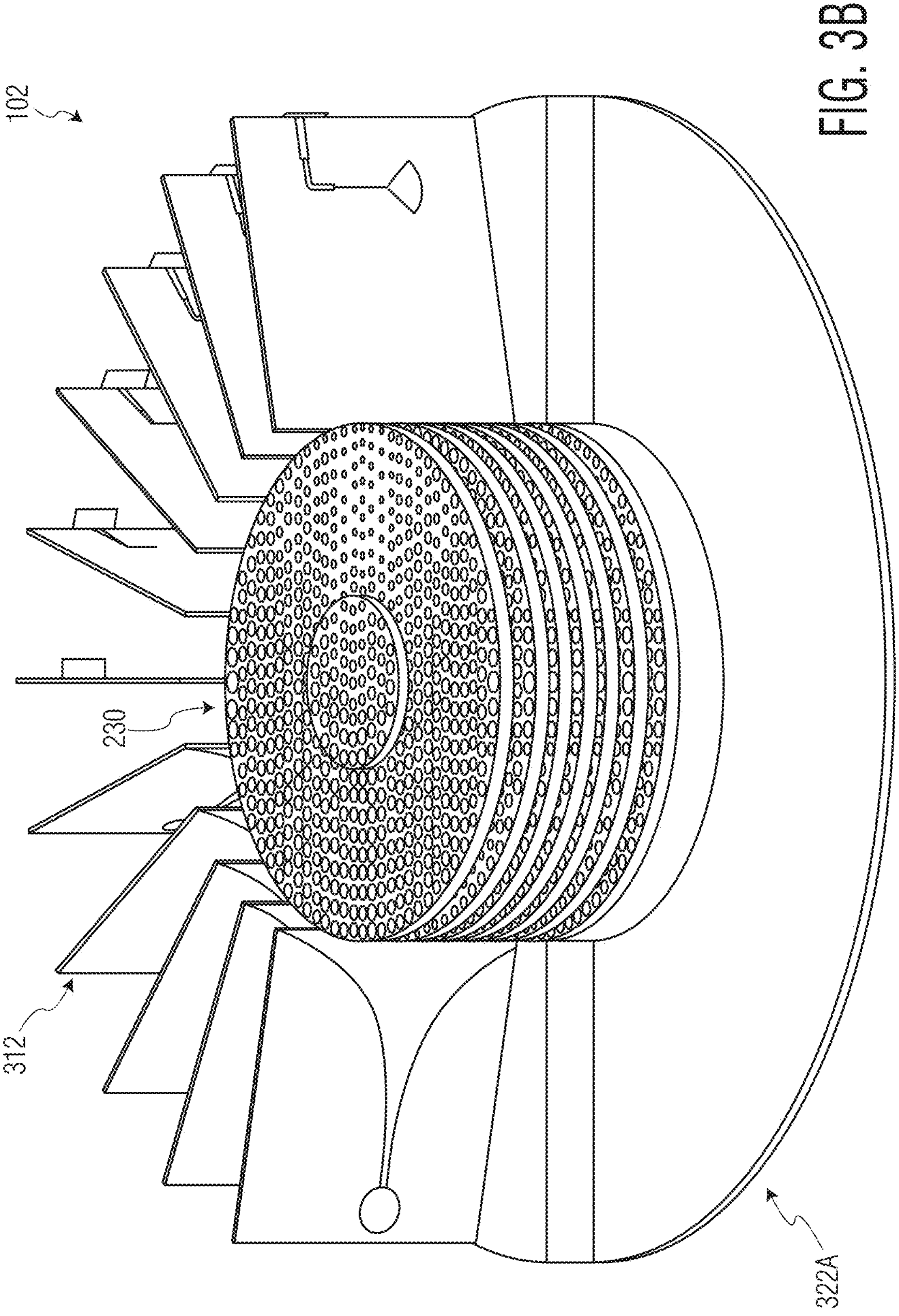
FIG. 3B shows a perspective view of a Luneburg lens assembly, according to an example embodiment of the present disclosure.

FIG. 3B shows a perspective view of the Luneburg lens assembly 102 including the Luneburg lens 230 and of RF reception antennas 312 positioned around Luneburg lens 230. For example, various antennas 312 are angularly spaced around the back side perimeter (i.e., side opposite the side facing the transmission target) of Luneburg lens 230. These antennas may be slot antennas (e.g., Vivaldi Antennas) that are coplanar and offer a broad-band frequency response. Again, the angular spacing (i.e., granularity) and the overall number of these antennas is configurable depending on the desired angular accuracy of the DOA determination. In general, Luneburg lens assembly 102 includes N antennas spaced D degrees apart, where N and D are predetermined to correspond to a DOA angular accuracy of Luneburg lens assembly 102. For example, if DOA accuracy of 15° is desired, then 11 antennas may be placed around Luneburg lens 230 as shown by the mounting angles in FIG. 3A.

Figure 3C:
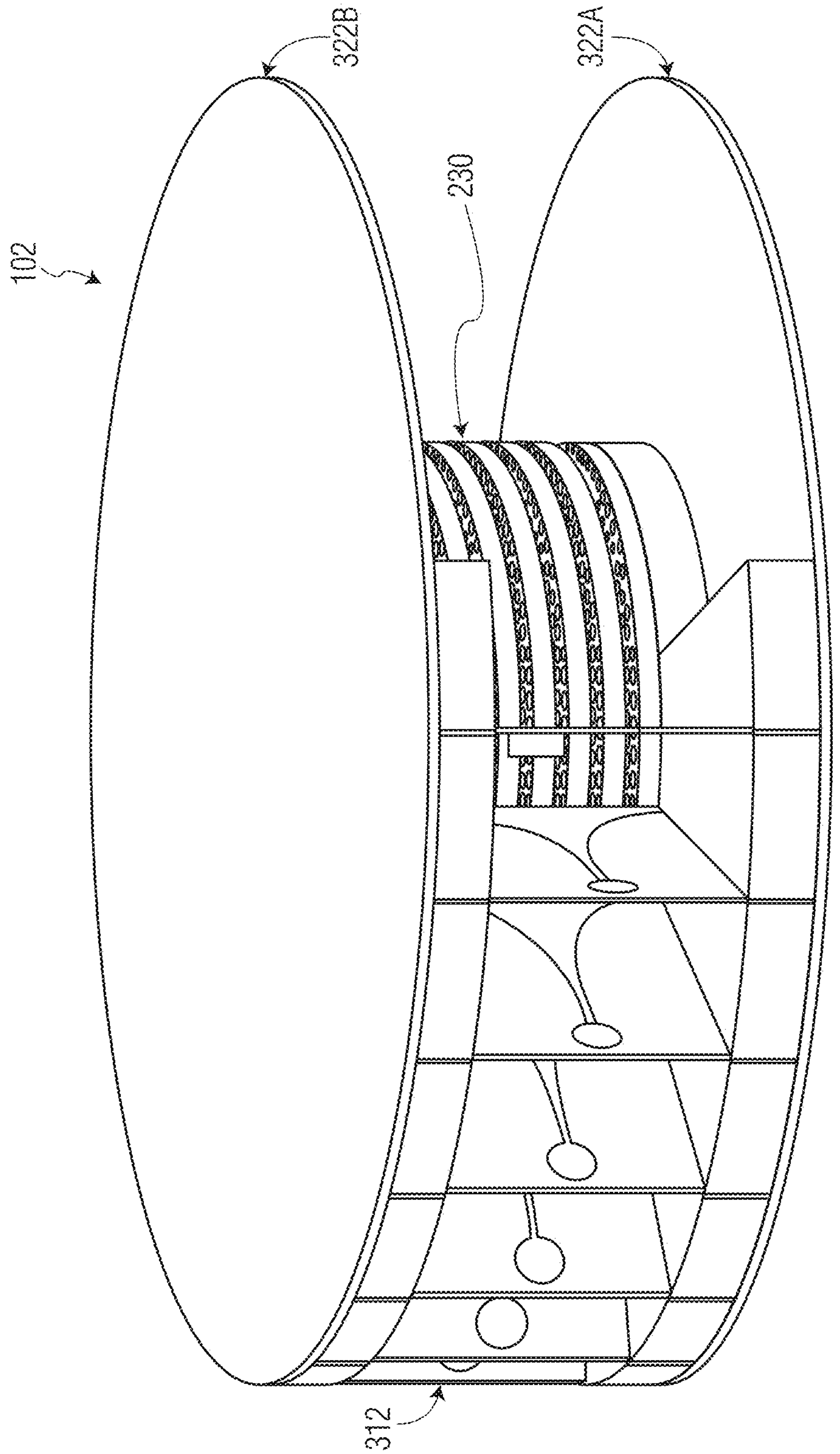
FIG. 3C shows a perspective view of a Luneburg lens assembly, according to an example embodiment of the present disclosure.

The Luneburg lens and antennas may be mounted to a substrate. For example, as shown in FIG. 3B, Luneburg lens 230 and antennas 312 are mounted to bottom plate 322A. In FIG. 3C, however, antennas 312 and Luneburg lens 230 may be partially enclosed in a housing including bottom plate 322A and top plate 322B which provide a mounting/housing platform such that the Luneburg lens assembly 102 can be safely and efficiently deployed in the field. It is noted that the Luneburg lens and antennas may be mounted to bottom plate 322A and/or top plate 322B using various methods (e.g., adhesive, mechanical connections, etc.). In addition, a guard plate (not shown) may also be sandwiched between the outer perimeter of bottom plate 322A and plate 322B to completely enclose antennas 312 and Luneburg lens 230 in a sealed housing. The housing may be dictated by the field in which the Luneburg lens assembly 102 is deployed.

Figure 3D:
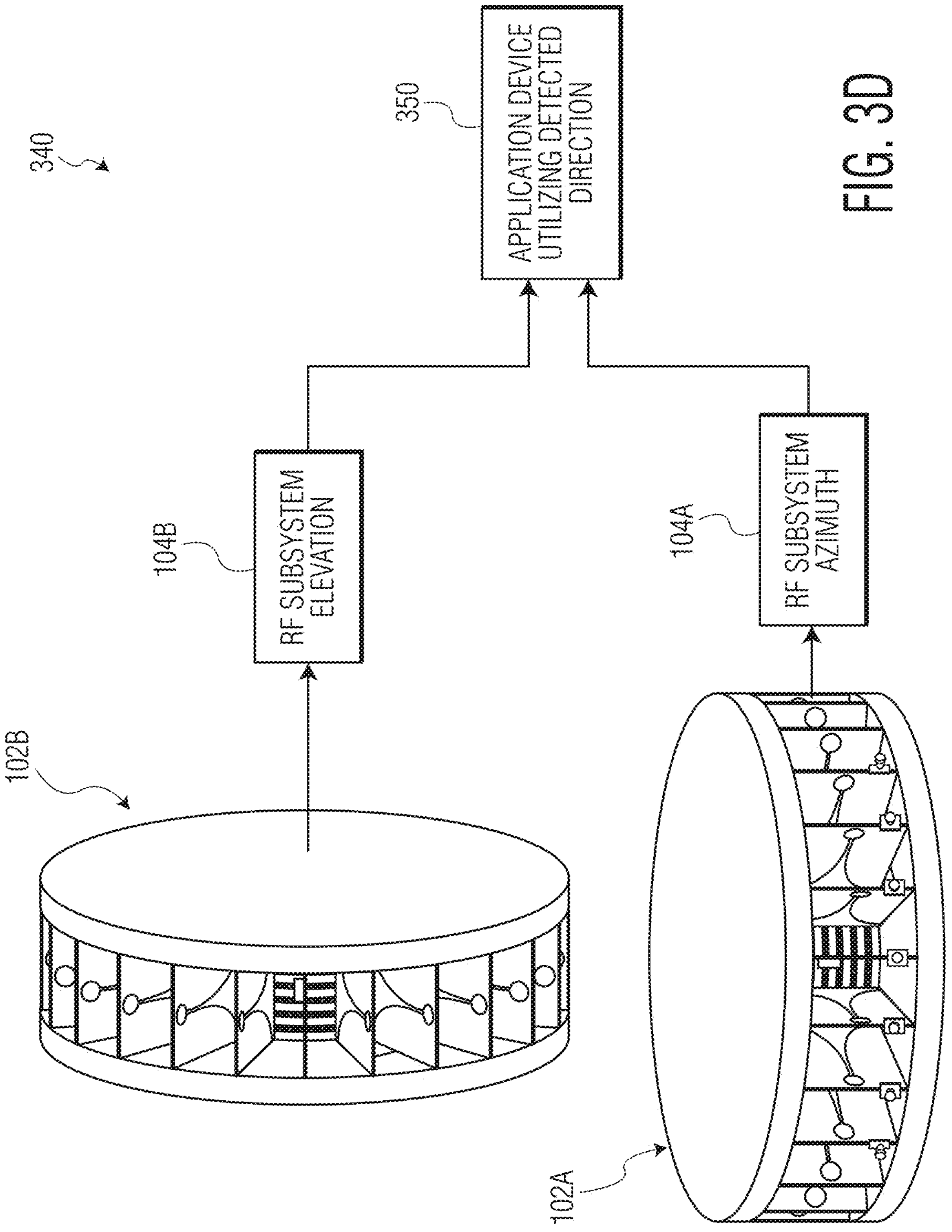
FIG. 3D shows a block diagram of a dual axis direction finding system, according to an example embodiment of the present disclosure.

The examples above describe the use of Luneburg lens assembly 102 for a 2D system where 2D DOA (e.g., azimuth DOA) is desired. However, some applications may desire a determination of DOA in 3-dimensional (3D) space. FIG. 3D shows a block diagram 340 of a direction finding system for determination of DOA in 3-dimensional (3D) space. To achieve 3D DOA, multiple (e.g., two) Luneburg lens assemblies may be oriented along different axes. In one example, a first Luneburg lens assembly 102A is oriented along an Azimuth axis or plane (e.g., parallel to ground) such that the antennas of Luneburg lens assembly 102A extend along the Azimuth axis or plane, whereas a second Luneburg lens assembly 102B is oriented along an Elevation axis or plane (e.g., perpendicular to ground) such that the antennas of Luneburg lens assembly 102B extend along the Elevation axis or plane. Each Luneburg lens assembly 102A and 102B has a corresponding RF processing system 104A and 104B for determining DOA along both axes independently which are then delivered to application device 350. With this configuration, the direction finding system has the capability to determine DOA of the impinging RF signal in terms of both azimuth angle and elevation angle. This may be beneficial because RF signals may be emitted from elevated structures and aircraft. For example, an airplane may be emitting an interference signal to a GPS receiver of application device 350 located on the ground. In this example, the RF signal impinges on both Luneburg lens assemblies 102A and 102B at distinct azimuth and elevation angles. RF processing systems 104A and 104B processed the received RF signals by Luneburg lens assemblies 102A and 102B to determine DOA that includes both an azimuth and elevation angle corresponding to the location of the airplane. The elevation angle combined with the azimuth angle may then then used by GPS receiver of application device 350 to determine a 3D DOA of the interfering signal and to take corrective measures.

Figure 4:
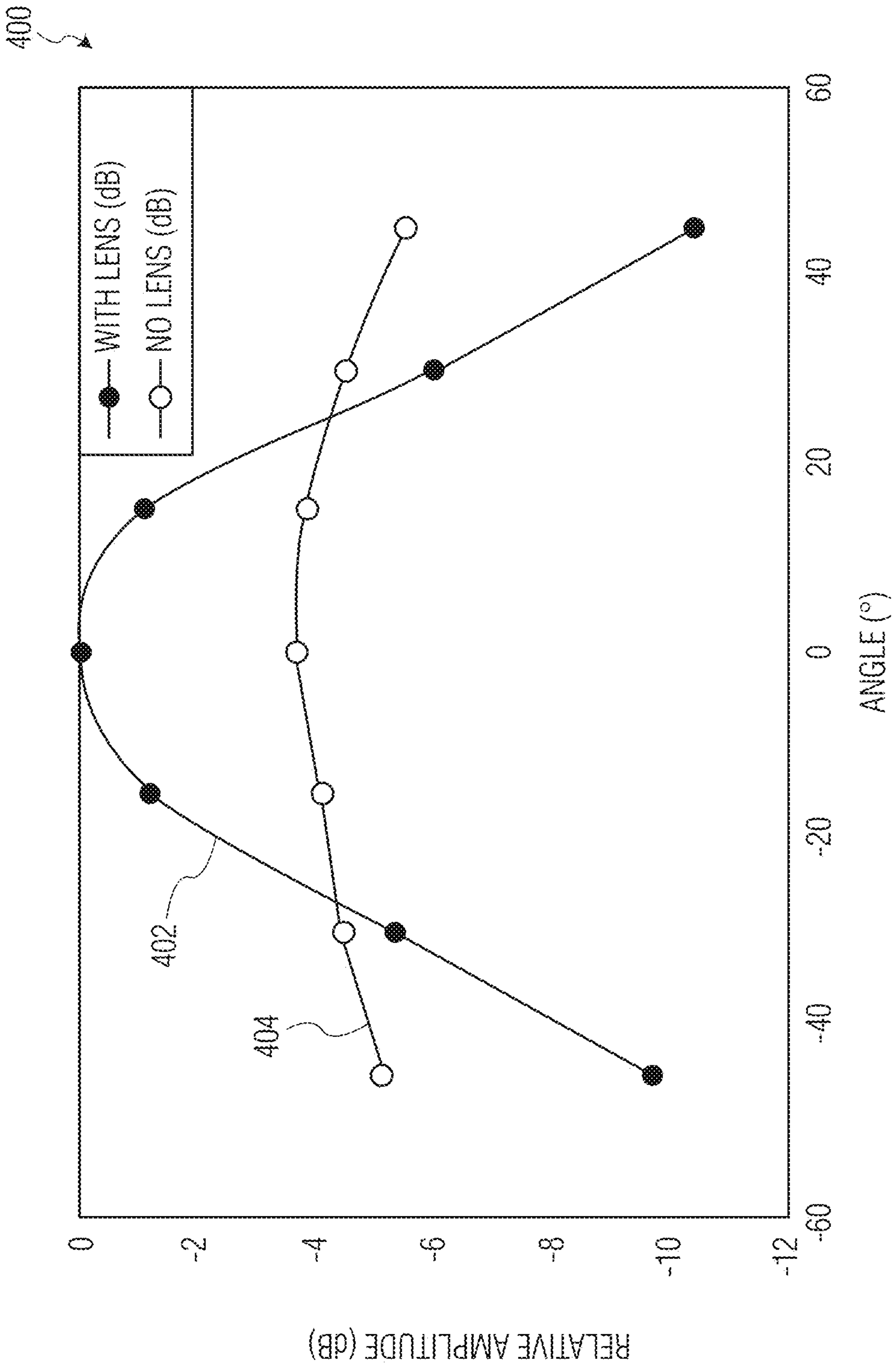
FIG. 4 shows a graph comparing performance between an antenna array with and without the Luneburg lens, according to an example embodiment of the present disclosure.

As mentioned above, the Luneburg lens refracts the RF signal to focus the power of the RF signal on a target antenna. FIG. 4 shows a graph 400 showing performance comparison between a Luneburg lens assembly 102 with the Luneburg lens (curve 402), and a corresponding assembly without the Luneburg lens (curve 404). In other words, FIG. 4 shows a graph that compares amplitude on a target antenna at 0° as received by Luneburg lens assembly 102 shown in FIG. 3C, and on a target antenna at 0° as received by Luneburg lens assembly 102 shown in FIG. 3C but with Luneburg lens 230 removed (i.e., received RF is not refracted). It is clear from the comparison that Luneburg lens 230 refracts and focuses the RF power to the target antenna at 0°, whereas the lack of Luneburg lens 230 results in a flat response that results in inaccurate DOA determinations (i.e., it is difficult to determine the maximum power signal received by the antennas due to the flat response and noise that will naturally be present).

Figure 5:
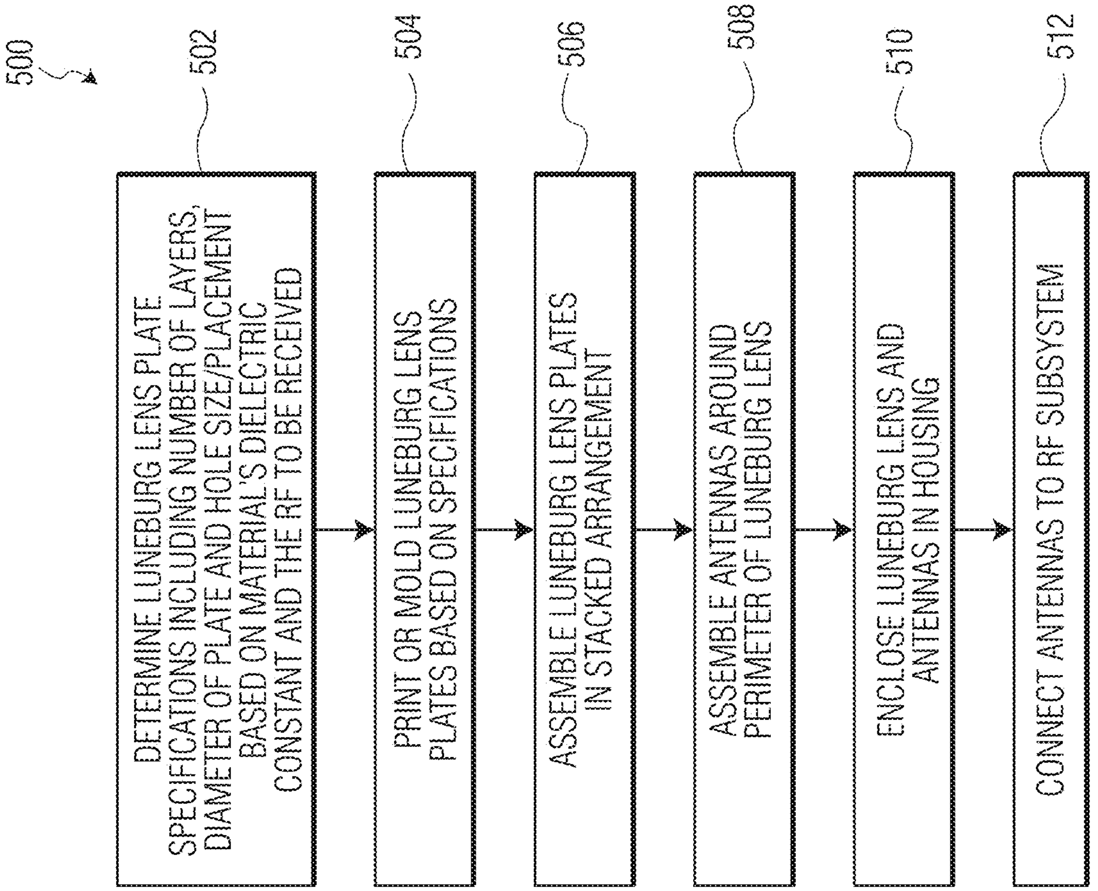
FIG. 5 shows a flowchart describing the manufacturing and assembly of the direction finding system, according to an example embodiment of the present disclosure.

FIG. 5 shows a flowchart 500 describing creation of the direction finding system. In step 502, the Luneburg lens specifications are determined. These specifications may include the number of plates, diameter of the plates, size/placement of the holes within the plates, plate rotations and other factors to achieve a desired RF refraction response within the Luneburg lens. For example, a diameter and a number of the plates may be initially set. Based on the chosen plate diameter and number of plates, the size/placement of the holes within the plates and relative angle of rotations between adjacent plates may be set to ensure a refractive index that accurately bends the incoming RF wave from one side of the plate to the opposite side of the plate such that the refracted RF wave is focused on a perimeter of the plate. These determinations are beneficial for ensuring that the resultant plates exhibit desirable refractive behavior when manufactured. In step 504, the Luneburg lens is additively manufactured, for example, by 3D printing the plates and spacers based on the specifications. The dielectric material used for additive manufacturing may be selected based on the plate design and other factors. In addition, the plates and spacers may be additively manufactured as separate components or may be additively manufactured as a common component. Separate plates and spacers may be beneficial for increased configurability of resultant Luneburg lens 200, whereas integral plates and spacers may be beneficial for case of assembly of Luneburg lens 200. In step 506, the Luneburg lens is then assembled by alternatingly stacking the plates and spacers. For example, a first plate may be mounted to a platform 322A, then a first spacer may be mounted to the first plate and then a second plate may be mounted to the first spacer. This process is repeated until the entire Luneburg lens is assembled. In addition, it is noted that the plates may be rotated by a predetermined angle with respect to one another (e.g.,) 180° as they are assembled to achieve the desired refractive index characteristics. In step 508, the antennas are positioned at specific angular positions around the perimeter of the Luneburg lens. These angular positions (i.e., granularity of antenna placement) are determined based on a desired accuracy of the DOA determinations. For example, if a desired accuracy 15° is desired, then 11 antennas may be placed around Luneburg lens 230 every 15°. In general, as the number of antennas increases and the angular separation between adjacent antennas decreases, the DOA accuracy increases. In step 510, the Luneburg lens and antennas may be at least partially enclosed in a housing for deployment in the field. For example, the Luneburg lens and antennas may be enclosed between lower/upper platforms 322A/322B which allow the Luneburg lens assembly to be mounted in the field to a structure or vehicle by fasteners (e.g., screws, glue, etc.) not shown. In step 512, the antennas are electrically connected to the antenna blocks of the RF system via wires and electrical connectors (not shown).

Figure 6:
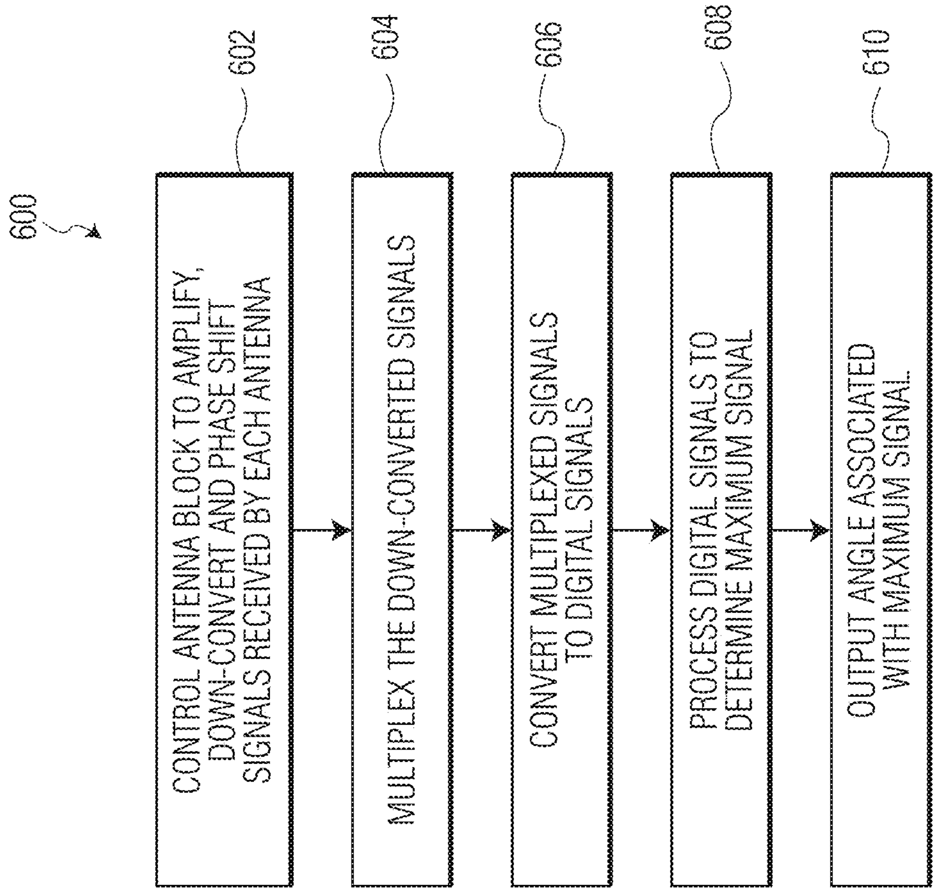
FIG. 6 shows a flowchart describing operation of the direction finding system, according to an example embodiment of the present disclosure.

FIG. 6 shows a flowchart 600 describing operation of the direction finding system. In step 602, the antenna block amplifies, down-converts and phase shifts the signals received by each of the antennas. This effectively converts the RF signals from each antenna to IF signals for further processing. In one example, the RF signal may be operating at 1.5 GHZ. The antenna block converts the 1.5 GHz signal to a lower frequency signal, for example a 1.5 KHz signal that can be properly sampled by ADC 112 for processing by DSP 114. In step 604, the multiplexer 110 multiplexes signals so that they may be processed individually. This multiplexing may be performed by frequency shifting the signals or inputting the signals individually to different channels of ADC 112 so they can be processed separately. In step 606, the ADC 112 converts the multiplexed signals to digital signals which are then processed by the DSP in step 608 to determine a maximum of the signals. For example, each of the digital signals can be input sequentially through a common channel or simultaneously through individual channels of DSP 114. In step 610, the DSP then determines an angle associated with the antenna that produced the maximum signal. For example, DSP 114 may compare each of the digital signals to one another to determine the maximum digital signal. This comparison may be a one-time determination or may be conducted many times over a period to ensure that false positives due to atmospheric and other conditions are avoided. For example, the antenna that produces the maximum signal the most number of times over a time period may be selected as the target antenna, or an angle (e.g., half-way point) between antennas that are alternatively outputting the maximum signal may be computed and set as the DOA. The known angle of this target antenna is output as the DOA to the application device. The DOA application device may use this angle to perform some task such as interference mitigation, target tracking and others.

It is noted that the antenna producing the maximum signal generally corresponds to the focal point of the Luneburg lens and therefore the DOA of the impinging RF signal. However, due to atmospheric and other conditions (e.g., multipathing, etc.), the antenna producing the maximum signal may temporarily not correspond to the DOA of the impinging RF signal. Thus, it may be beneficial to take the multiple DOA measurements over a given time period and set the DOA according to the DOA determined over the multiple measurements (e.g., average DOA, etc.).

While the foregoing is directed to example embodiments described herein, other and further example embodiments may be devised without departing from the basic scope thereof. For example, aspects of the present disclosure may be implemented in hardware or software or a combination of hardware and software. One example embodiment described herein may be implemented as a program product for use with a computer system. The program(s) of the program product defines functions of the example embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid-state random-access memory) on which alterable information is stored. Such computer-readable storage media, when carrying computer-readable instructions that direct the functions of the disclosed example embodiments, are example embodiments of the present disclosure.

It will be appreciated by those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed is:

1. A direction finding system comprising:

a gradient index lens comprising a plurality of stacked dielectric plates, each of the plurality of stacked dielectric plates having a plurality of through holes causing a gradual variation of a refractive index across a diameter of each of the plurality of stacked dielectric plates;

a plurality of antennas located around a section of a perimeter of the gradient index lens, wherein the gradual variation of the refractive index in each of the plurality of stacked dielectric plates causes the gradient index lens to direct a radio frequency (RF) signal received by the gradient index lens towards a target antenna of the plurality of antennas; and an RF processing system coupled to the plurality of antennas, the RF processing system is configured to:

process an RF signal received by the plurality of antennas and determine received signal strength for each of the plurality of antennas, and determine a direction of arrival of the RF signal based on a location of the target antenna of the plurality of antennas that outputs the received signal strength above a threshold.

2. The system of claim 1, wherein the gradual variation of the refractive index is caused by at least one of a gradual variation in diameters of the plurality of through holes in the plurality of stacked dielectric plates, and a distribution of the plurality of through holes in the plurality of stacked dielectric plates.

3. The system of claim 1, wherein the plurality of stacked dielectric plates are alternatingly oriented at two or more different angles with respect to a reference direction such that the gradual variation of the refractive index is alternatingly oriented at the two or more different angles.

4. The system of claim 1, further comprising:

spacers forming gaps between the plurality of stacked dielectric plates.

5. The system of claim 1, wherein the plurality of antennas are Vivaldi antennas.

6. The system of claim 1, wherein the plurality of antennas are arranged around the section of the perimeter of the gradient index lens and are separated by predetermined angles.

7. The system of claim 1, wherein the section of the perimeter of the gradient index lens where the plurality of antennas are located is a half of the perimeter of the gradient index lens, the section being oriented to face opposite the direction of arrival of the RF signal.

8. The system of claim 1, wherein the RF processing system further comprises:

an RF circuit configured to down convert the received RF signal from each of the plurality of antennas to an intermediate frequency (IF) signal; and a signal processor configured to:

determine a maximum of the received signal strength from the IF signal of the plurality of antennas, and determine the direction of arrival of the RF signal based on a location of the target antenna of the plurality of antennas that outputs the maximum of the received signal strength.

9. The system of claim 1, wherein the plurality of antennas extend along an azimuth plane and the RF processing system is configured to determine the direction of arrival of the RF signal on the azimuth plane.

10. The system of claim 9, further comprising:

an additional gradient index lens comprising a plurality of additional stacked dielectric plates, each of the plurality of additional stacked dielectric plates having a plurality of through holes causing a gradual variation of a refractive index across a diameter of each of the additional plurality of stacked dielectric plates; and an additional plurality of antennas located around a section of a perimeter of the additional gradient index lens, wherein the gradual variation of the refractive index in each of the additional plurality of stacked dielectric plates causes the additional gradient index lens to direct the RF signal received by the gradient index lens towards a target antenna of the additional plurality of antennas, and wherein the additional plurality of antennas extend along an elevation plane and the RF processing system is configured to determine the direction of arrival of the RF signal on the elevation plane.

11. A gradient index lens system comprising:

a gradient index lens comprising a plurality of stacked dielectric plates, each of the plurality of stacked dielectric plates having a plurality of through holes causing a gradual variation of a refractive index across a diameter of each of the plurality of stacked dielectric plates; and a plurality of antennas arranged and separated by predetermined angles around a section of a perimeter of the gradient index lens, wherein the gradual variation of the refractive index in each of the plurality of stacked dielectric plates causes the gradient index lens to direct a radio frequency (RF) signal received by the gradient index lens towards a target antenna of the plurality of antennas.

12. The system of claim 11, wherein the gradual variation of the refractive index is caused by at least one of gradual variation in diameters of the plurality of through holes in the plurality of stacked dielectric plates, and distribution of the plurality of through holes in the plurality of stacked dielectric plates.

13. The system of claim 11, wherein the plurality of stacked dielectric plates are alternatingly oriented at two or more different angles with respect to a reference direction such that the gradual variation of the refractive index is alternatingly oriented at the two or more different angles.

14. The system of claim 11, further comprising:

spacers forming gaps between the plurality of stacked dielectric plates.

15. The system of claim 14, wherein the gaps between the plurality of stacked dielectric plates are air gaps or are filled with dielectric material.

16. The system of claim 11, wherein the plurality of antennas are Vivaldi antennas.

17. The system of claim 11, wherein the predetermined angles between the plurality of antennas correspond to a predetermined target antenna granularity with respect to a direction of arrival of the RF signal.

18. The system of claim 11, wherein the section of the perimeter of the gradient index lens where the plurality of antennas are located is a half of the perimeter of the gradient index lens, the section being oriented to face opposite a direction of arrival of the RF signal.

19. The system of claim 18, wherein the plurality of antennas includes at least N antennas spaced D degrees apart, wherein N and D are predetermined to correspond to an angular accuracy of the gradient index lens system.

* * * * *